(12) United States Patent
Hughes

(10) Patent No.: US 8,297,131 B2
(45) Date of Patent: Oct. 30, 2012

(54) APPARATUS FOR THE MEASUREMENT OF LIQUID FLOW RATES

(75) Inventor: William C. Hughes, Woodstock, IL (US)

(73) Assignee: Innoquest, Inc., Woodstock, IL (US)

( * ) Notice: Subject to any disclaimer, the term of this patent is extended or adjusted under 35 U.S.C. 154(b) by 304 days.

(21) Appl. No.: 12/719,040

(22) Filed: Mar. 8, 2010

(65) Prior Publication Data

US 2010/0236337 A1   Sep. 23, 2010

Related U.S. Application Data

(60) Provisional application No. 61/210,304, filed on Mar. 17, 2009.

(51) Int. Cl.
*G01F 1/56* (2006.01)
*G01F 23/00* (2006.01)

(52) U.S. Cl. .................. 73/861.08; 73/291; 73/861
(58) Field of Classification Search .................. None
See application file for complete search history.

(56) References Cited

U.S. PATENT DOCUMENTS

| | | | | |
|---|---|---|---|---|
| 3,986,399 A | * | 10/1976 | Satou et al. | 73/706 |
| 4,371,790 A | * | 2/1983 | Manning et al. | 307/118 |
| 4,433,577 A | * | 2/1984 | Khurgin et al. | 73/290 V |
| 4,669,308 A | * | 6/1987 | Jorritsma | 73/223 |
| 5,035,139 A | * | 7/1991 | Hoefelmayr et al. | 73/223 |
| 5,094,112 A | * | 3/1992 | Hoefelmayr et al. | 73/861.04 |
| 5,564,305 A | * | 10/1996 | Cadeo | 73/304 R |
| 5,889,202 A | * | 3/1999 | Alapati et al. | 73/64.45 |
| 5,901,740 A | * | 5/1999 | Sanchelima | 137/392 |
| 2006/0021432 A1 | * | 2/2006 | Salzmann et al. | 73/304 R |
| 2011/0000309 A1 | * | 1/2011 | Griffiths et al. | 73/861.08 |

* cited by examiner

*Primary Examiner* — Harshad R Patel
(74) *Attorney, Agent, or Firm* — Reinhart Boerner Van Deuren P.C.

(57) ABSTRACT

A flow rate meter that includes a container of known and fixed volume. Electrodes, or sensors, are placed inside the container at several different heights. An electronic circuit uses the electrodes, or sensors, to measure the time it takes this container of known and fixed volume to fill a certain distance with water or water-based solution. The electronic circuit calculates the flow rate in engineering units from this elapsed time by knowing the volume of the container between the fixed electrodes.

23 Claims, 3 Drawing Sheets

Section A-A

Section A-A

APPARATUS FOR THE MEASUREMENT OF LIQUID FLOW RATES

CROSS-REFERENCE TO RELATED PATENT APPLICATIONS

This patent application claims the benefit of U.S. Provisional Patent Application No. 61/210,304, filed Mar. 17, 2009, the entire teachings and disclosure of which are incorporated herein by reference thereto.

FIELD OF THE INVENTION

This invention generally relates to measuring devices, and, more specifically, to devices used for measuring liquid flow rates.

BACKGROUND OF THE INVENTION

Conventional flow rate measurement and calibration systems have required the water or water-based solution to discharge directly into the flow meter, pass through the flow meter, then empty into open atmosphere. This conventional method of flow rate measurement adds back pressure to the point of discharge at the nozzle, faucet, showerhead, pump, sprinkler head, pipe, or irrigation nozzle and, therefore, may adversely affect the accuracy of the measurement by altering the true flow rate, which is desired to be measured.

Conventional practices for measuring flow rate into an open atmosphere involves catching the flow in a calibrated volumetric container for a specified period of time, which is often measured with a stopwatch. Modern agricultural sprayers can have greater than 50 nozzles on a boom. Typically, this method involves the user holding a graduated pail under the nozzle being tested and using a stop watch to mark out one minute so the flow rate could be read from the pail graduations. This process requires two hands and can be quite time consuming if, for example, the flow rate from each nozzle of a 50-nozzle spraying system is being tested.

It would therefore be desirable to have an apparatus for accurately determining the flow rate of a liquid at the point of discharge that does not create back pressure at the point of discharge. It would also be desirable if the apparatus could provide flow rate data more quickly than conventional flow rate measurement systems without the use of a stopwatch. The invention provides such a flow rate measurement apparatus. These and other advantages of the invention, as well as additional inventive features, will be apparent from the description of the invention provided herein.

BRIEF SUMMARY OF THE INVENTION

In one aspect, embodiments of the invention provide a flow rate meter that includes a constant-volume container with an attached electronic circuit and display. In at least one embodiment, sensors placed inside the constant-volume container measure the elapsed time during filling, which is a function of the liquid flow rate into the container. The electronic circuit senses this filling event and then calculates and displays a flow rate on the display.

In another aspect, embodiments of the invention provide a flow rate meter that includes a container with a closed end and an open end, and a measuring apparatus attached to the container. In an embodiment of the invention, the measuring apparatus has a first electrode configured to be inserted through a wall of the container such that the first electrode is suspended inside the container at a first distance from the closed end. This embodiment further includes a second electrode configured to be inserted through the wall of the container such that the second electrode is suspended inside the container at a second distance from the closed end, the second distance being greater than the first distance. Further, the measuring apparatus is configured to determine a flow rate based on the amount of time needed for a liquid level to rise from the first electrode to the second electrode.

In yet another aspect, embodiments of the invention provide a method of manufacturing a flow rate measurement system that includes the steps of providing a container having an open end and a closed end, and affixing a measuring device to the container. In an embodiment, the measuring device includes a plurality of electrodes inserted into the container through a wall thereof. In this embodiment, the method further includes calibrating the measuring device, based on a volume of the container, to calculate a flow rate. In this embodiment, the flow rate is determined by the time it takes for liquid flowing into the open end of the container to rise from a first electrode of the plurality of electrodes to a second electrode of the plurality of electrodes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
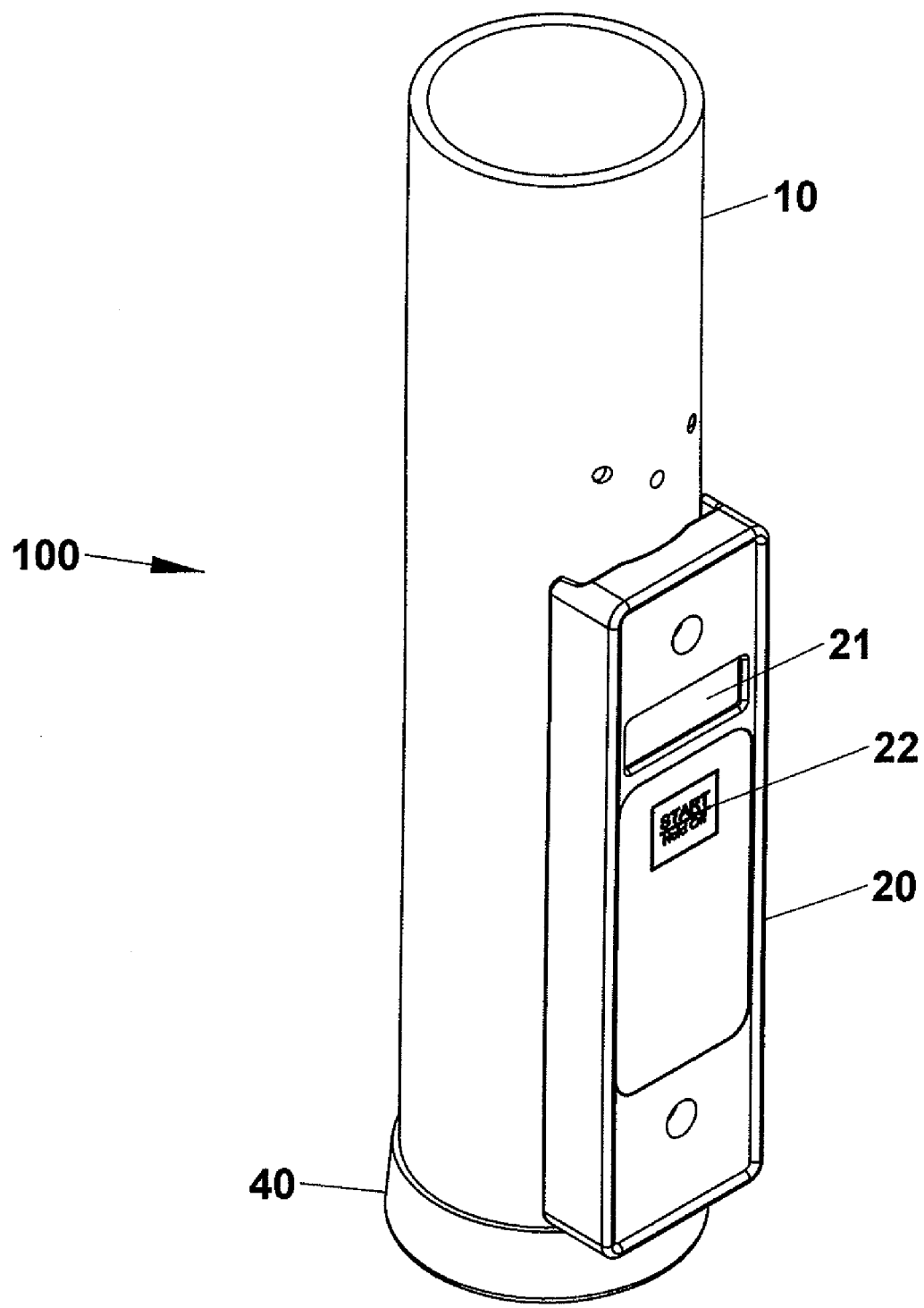
FIG. 1 is a perspective view of a flow rate meter, constructed in accordance with an embodiment of the invention.

A flow rate meter 100, constructed in accordance with an embodiment of the invention, is shown in FIGS. 1-4. The flow rate meter includes a hollow container 10 and an electronic circuit 60 placed on circuit board 30 contained in sealed housing 20. In an embodiment of the invention, the flow rate meter 100 is held in an upright position as shown in FIG. 1. End cap 40 covers a compartment 41 in the lower end of hollow container 10, which contains batteries 34 for powering the electronic circuit 60 on circuit board 30. In an embodiment, the sealed housing 20 is mounted to the outside of hollow container 10 such that electrodes 31, 32 and 33 protrude into an inner hollow portion of hollow container 10. In some embodiments, the sealed housing is configured to be removable from the hollow container so that the electronics in the sealed housing 20 can be serviced or replaced as necessary. The top end of hollow container 10 is open to allow water or water-based solutions to enter the hollow container 10 during operation. The bottom end 11 of hollow container 10 is closed so that water or water-based solutions that enter the top of the hollow container 10 during use are retained fully inside.

In at least one embodiment of the invention, a control button 22 is pressed by the user to ready a microcontroller 35 for a measurement. The user then directs the flow of water or water-based solution fully into the top of hollow container 10. This flow causes hollow container 10 to start filling. As the fill progresses, the level of fluid is detected by electrodes 31, 32 and 33. The fill time between electrode 32 and 33 is recorded by the microcontroller 35. The microcontroller 35 then performs a calculation based on this fill time and the volume of the hollow container 10 between electrodes 32 and 33 to determine the flow rate of liquid entering the hollow container 10. Once the fill level has reached electrode 33 and a reading has been displayed on display 21 by microcontroller 35, then hollow container 10 can be emptied of its fluid contents by tipping the hollow container 10 upside down, thus allowing contained fluid to empty out from the open top of hollow container 10.

Figure 2:
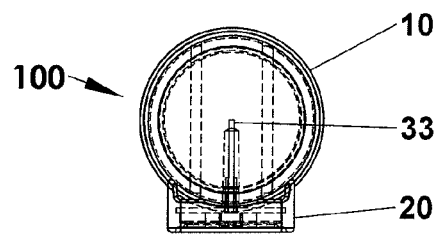
FIG. 2 is a top view of the flow rate meter of FIG. 1.
Figure 3:
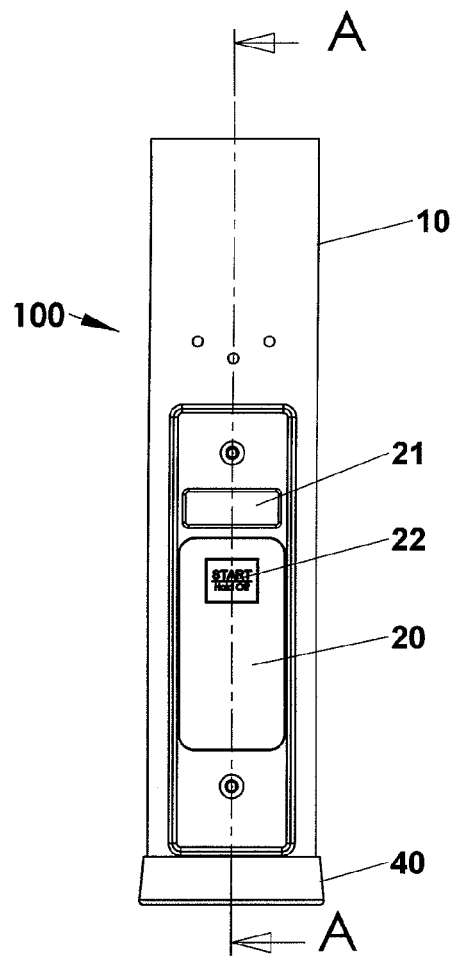
FIG. 3 is a front view of the flow rate meter of FIG. 1.

Referring now to the invention in more detail, FIGS. 2 and 3 show a hollow container 10, which, in this particular embodiment, is comprised of a circular tube, or other suitable container, such that it is open on the top and closed on the bottom 11. In at least one embodiment, hollow container 10 is formed or molded from clear or opaque plastic. In alternate embodiments hollow container 10 is formed from metal or glass. The material used to construct the hollow container 10 should be a rigid material, such that the volume of the container is constant and does not change during use, or between uses.

Figure 4:
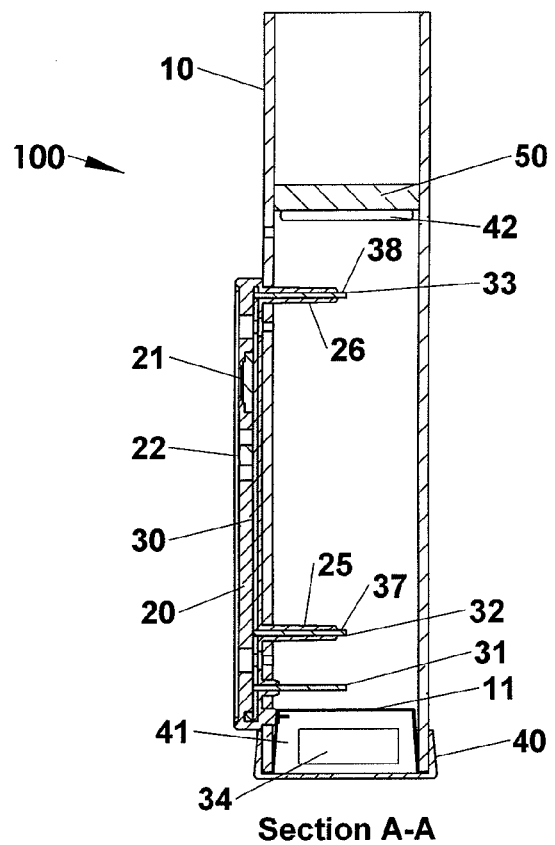
FIG. 4 is a cross-sectional view of the flow rate meter of FIG. 1.

Now referring to FIG. 1 and FIG. 4 in more detail, in an embodiment of the invention, sealed housing 20 is comprised of a molded or fabricated plastic or metal enclosure to completely encase circuit board 30 and provides a means of protecting said circuit board 30 from dust, moisture, and physical damage. In a preferred embodiment, sealed housing 20 is made from molded plastic which fully encapsulates circuit board 30. In the embodiment shown, sealed housing 20 is positioned and attached to hollow container 10 such that electrodes 31, 32, and 33 projecting from circuit board 30 are placed inside hollow container 10. FIGS. 2 and 4 provide an exemplary illustration of electrodes 31, 32, and 33 projecting into the center of hollow container 10.

Referring to FIG. 4, circuit board 30 is shown embedded in sealed housing 20 with display 21 and start button 22 attached directly to the circuit board 30. Electrodes 31, 32, and 33 are also attached directly to circuit board 30. In the embodiment shown, with respect to electrodes 32 and 33, the sealed housing 20 extends and covers the majority of the electrodes' 32, 33 length 25, 26, such that only a small conductive portions 37, 38 of their length are exposed metal. In an embodiment of the invention, those small conductive portions 37, 38 are positioned towards the center of an interior portion of the hollow container 10. Placement of the conductive portions 37, 38 of these electrodes 32, 33 substantially at the center of an interior portion of hollow container 10 allows tilting of the container 10 from the vertical axis without causing a change in the sensed level of fluid due to their central location and the circular cross-section of hollow container 10. This is accomplished because as hollow container 10 is tilted the center point of the fluid surface does not change elevation while the outer levels of the fluid surface will vary greatly as the angle of the tube is changed. Locating electrodes 32, 33 in the center of hollow container 10 also keeps fluid that is coating and/or running down the inside wall of the hollow container 10 from falsely triggering the electrodes 32, 33. In an embodiment of the invention, the lowest electrode 31 is a reference electrode. In the embodiment shown, the lowest electrode 31 is made of entirely exposed metal. Exposing more metallic surface area helps to increase the strength of signals between electrode 31 and electrodes 32, 33 due to the greater conductivity of the lowest electrode 31.

In at least one embodiment, electrode 32 is placed some distance above the bottom 11 of the hollow container 10. This arrangement provides for accurate and repeatable readings since it allows time for the flow of fluid to stabilize as the hollow container 10 is placed under the flow discharge to be tested. Because the hollow container 10 cannot be instantly placed under the full flow discharge, some time is required to bring the flow discharge pattern inside the hollow container 10 to the point that the flow from the discharge is fully contained within the hollow container 10. Also, the initial flow of fluid down into the bottom of the hollow container 10 causes turbulence that could cause false triggering on electrode 32 if it were placed too close to the bottom 11 of hollow container 10.

Still referring to FIG. 4, a diffuser pad 50 is placed in the upper end of hollow container 10 to keep spraying or splashing water or water-based solutions from filling the hollow container 10 in a disorderly way and thus to direct liquid spray away from the center of the hollow container. This acts to keep the liquid spray from directly hitting the electrodes 32, 33 or the surface of the gathering fluid in hollow container 10. This helps control the direction of flow of water or water-based solution during filling and allows the flow rate meter 100 to give accurate and repeatable results. In an embodiment of the invention, the diffuser pad 50 may be constructed of metallic or non metallic material such that water may pass through, but with no direct flow path from its top side to its bottom side. In alternate embodiments, the diffuser pad 50 may be constructed of layers of perforated material, cloth, wire mesh, or other loose fibrous material. In at least one embodiment, the diffuser pad 50 is comprised of a non-woven nylon fiber bed. Such a material allows liquid to flow freely through but does not allow direct spray to pass through. In operation, the liquid spray hits the diffuser pad 50 as a hard spray on its top side and then passes through as a gentle flow down the inside of the hollow container 10 as it exits the bottom side of diffuser pad 50. In this manner, the diffuser pad 50 helps keep the rising fluid level in the hollow container 10 free of turbulence so that electrode or sensor contact is consistent and, thus, accurately represents the true liquid level. In at least one embodiment diffuser pad 50 is supported by support rods 42. Support rods 42 keep the force of spraying liquid from forcing diffuser pad 50 into hollow container 10 during use.

Figure 5:
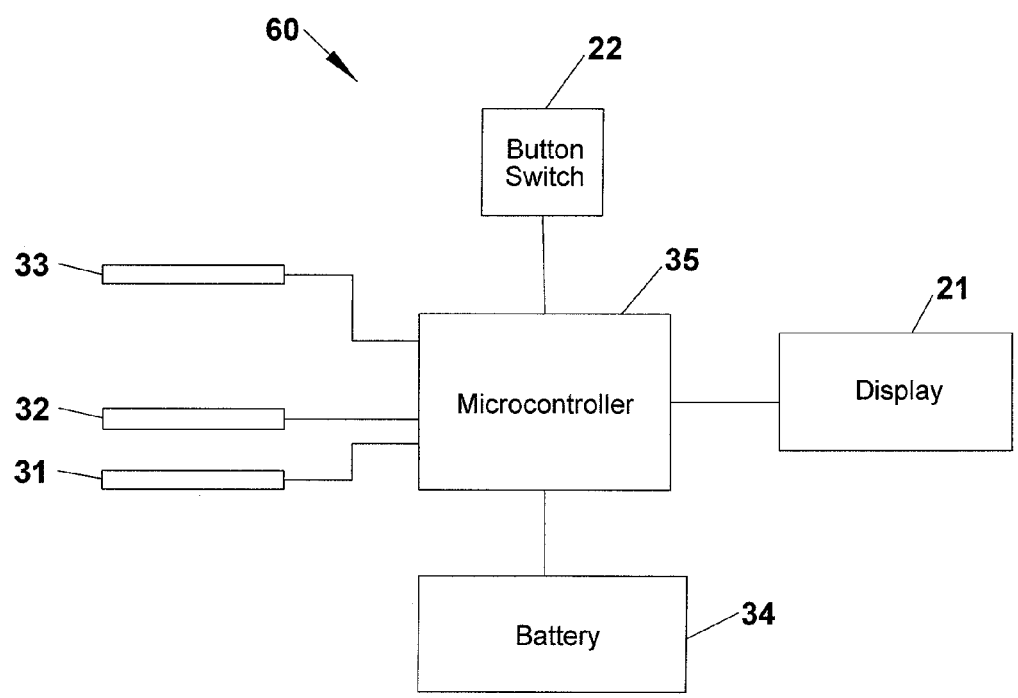
FIG. 5 is a block diagram of an electronic circuit configured to be incorporated into the flow rate meter of FIG. 1.

FIG. 5 is a block diagram of an electronic circuit 60 configured to be employed in the flow rate meter 100. In this embodiment, the electronic circuit 60 includes the battery 34, microcontroller 35, control button 22, display 21, and electrodes 31, 32, and 33. In an embodiment of the invention, circuit board 30, as shown in FIG. 4, includes the electronic circuit 60. Battery 34 provides power to microcontroller 35, which senses conductivity between electrodes 31 and 32 or 33, and displays calculated flow readings on display 21. Water or water-based solutions are conductive and allow current to flow between electrode 31 and either electrode 32 or 33. Microcontroller 35 checks first for conductivity between electrode 31 and 32 to sense when fluid level has reached electrode 32. When the fluid level reaches electrode 32, then microcontroller 35 will start checking for conductivity between electrode 31 and 33 to sense when the fluid level reaches electrode 33.

Microcontroller 35 measures the time difference between when the fluid level reached electrode 32 and electrode 33, and then calculates the flow rate of liquid into hollow container 10. The volume of hollow container 10 is known and fixed between the separation distance of electrodes 32 and 33. Control button 22 allows the user to place the microcontroller 35 into different operational modes including, but not limited to, "turn on," "shut off," "change displayed measurement units," and "begin a reading sequence." Display 21 may be an LCD or LED, or other suitable type of display. In a preferred embodiment, display 21 is an LCD display, which facilitates low power draw on battery 34. Electrodes 31, 32 and 33 are of a conductive material. In at least one embodiment, electrodes 31, 32, and 33 are made of stainless steel, which is corrosion resistant, conductive, and may be soldered directly to circuit board 30 with proper chemical flux.

As described herein, the flow rate meter 100 does not apply back pressure during the measurement process, because the water or water-based liquid discharges through the nozzle, faucet, showerhead, pump, sprinkler head, pipe, or irrigation nozzle into the atmosphere and then into the hollow container 10 of the flow rate meter 100. The flow rate meter 100 accomplishes this function with a measuring device that has no moving parts and is configured to sense the fluid level internally using electrodes that can detect changes in conductivity. Further, the addition of a diffuser pad controls and manages the flow of liquid into the hollow container 10 to limit the velocity and turbulence of the entering liquid. A further feature of the flow rate meter 100 is its ability to tolerate tilting or movement of the hollow container 10 during a reading due to the centrally located electrodes 32, 33. The use of an open-top container allows for the rapid filling and emptying of liquid during operational use. A further feature of flow rate meter 100 is the direct attachment of the electronic circuit 60 and display 21 to the measuring container 10 so that the flow rate meter 100 may all be carried as a single object. The flow rate meter 100 therefore has no moving parts, and its accuracy is stable over time. In at least one embodiment, the electronic circuit 60 is powered by batteries 34 and displays flow rate on a display 21.

By integrating a constant volume container with an electronic circuit that measures the time required for filling a known volume and automatically calculates and displays the flow rate in engineering units, the flow rate meter 100 may, for example, be used to quickly and accurately check the flow rate output from a single spray nozzle, or from multiple spray nozzles. The flow rate meter 100 measures and reports flow rate electronically in gallons, fluid ounces, or liters per minute or other suitable units. The flow rate meter 100 may therefore provide quick and accurate assessment of nozzle flow rate allowing a user to quickly check all nozzles on a spray boom to determine if the nozzles are functioning as expected. The flow rate meter 100 can accomplish the same task with reading times, for example, of around 10-15 seconds per nozzle versus the 75-90 seconds that is common for conventional flow rate measurement systems. One of ordinary skill in the art will recognize that checking flow rates for agricultural spray nozzles is only one possible use for the flow rate meter 100. It is contemplated that the flow rate meter 100 may also be used to provide flow rate measurements for faucets, pumps, showerheads, sprinkler heads, water pipes, etc.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow rate meter comprising:
   a container with a closed end and an open end;
   a measuring apparatus attached to the container, the measuring apparatus comprising:
   a first electrode inserted through a wall of the container such that the first electrode is suspended inside the container at a first distance from the closed end; and
   a second electrode inserted through the wall of the container such that the second electrode is suspended inside the container at a second distance from the closed end, the second distance being greater than the first distance;
   wherein the measuring apparatus is determines a flow rate based on the amount of time needed for a liquid level to rise from the first electrode to the second electrode.

2. The flow rate meter of claim 1, further comprising a diffuser pad configured to reduce the velocity of liquid flowing into the open end of the container prior to the liquid impacting the first and second electrodes.

3. The flow rate meter of claim 2, wherein the diffuser pad is further configured to direct a flow of liquid entering the open end of the container towards a wall of the container.

4. The flow rate meter of claim 2, wherein the diffuser pad is made from of a non-woven nylon fiber bed.

5. The flow rate meter of claim 1, further comprising a reference electrode configured to be inserted through the wall of the container such that the reference electrode is suspended inside the cylinder at a third distance from the closed end, the third distance being less than the first distance.

6. The flow rate meter of claim 1, wherein the tips of the first and second electrode are positioned substantially at the center of an interior portion of the container.

7. The flow rate meter of claim 1, wherein the measuring apparatus is configured to be removable from the container.

8. The flow rate meter of claim 1, wherein the container includes a battery compartment, configured to provide power to the measuring apparatus.

9. The flow rate meter of claim 1, wherein the measuring apparatus comprises an electronic circuit disposed in a sealed housing configured to protect the electronic circuit from dust, moisture, and physical damage.

10. The flow rate meter of claim 9, wherein the measuring apparatus includes an LCD display, and a button configured to place the measuring apparatus in one or more different operating modes.

11. The flow rate meter of claim 9 wherein, except for exposed metal tips, a substantial portion of the first and second electrodes is insulated by the sealed housing.

12. The flow rate meter of claim 1, wherein the container is made from clear plastic.

13. The flow rate meter of claim 1, further comprising a microcontroller coupled to the first electrode and the second electrode, the microcontroller configured to determine the flow rate based on a known container volume between the first electrode and the second electrode, and the amount of time taken for the liquid level to rise from the first electrode to the second electrode.

14. A method of manufacturing a flow rate measurement system comprising the steps of:
   providing a container having an open end and a closed end;
   affixing a measuring device to the container, wherein the measuring device includes a plurality of electrodes inserted into the container through a wall thereof;
   calibrating the measuring device, based on a volume of the container, to calculate a flow rate, wherein the flow rate is determined by the time it takes for liquid flowing into the open end of the container to rise from a first electrode of the plurality of electrodes to a second electrode of the plurality of electrodes.

15. The method of claim 14, further comprising placing a diffuser pad inside the container between the open and closed ends, the diffuser pad configured to reduce the velocity of liquid flowing into the open end of the container prior to the liquid impacting one of the plurality of electrodes, and further configured to direct the flow of liquid entering the open end of the container towards a wall of the container.

16. The method of claim 15, wherein placing a diffuser pad inside the container comprises placing a diffuser pad made from one of a loose fibrous material, a wire mesh material, and a cloth material inside the container.

17. The method of claim 14, wherein the plurality of electrodes includes a reference electrode inserted into the container through a wall thereof.

18. The method of claim 14, wherein providing a container comprises providing a container made from one of a clear plastic, a metal, an opaque plastic, and glass.

19. The method of claim 14, wherein affixing a measuring device to the container comprises affixing a removable measuring device to the container.

20. The method of claim 14, wherein the measuring device comprises an electronic circuit disposed within a sealed housing.

21. The method of claim 14, wherein providing a container comprises providing a container having a battery compartment therein.

22. The method of claim 14, further comprising positioning the tip of the first electrode of the plurality of electrodes, and the tip of the second electrode of the plurality of electrodes substantially at the center of an interior portion of the container.

23. The method of claim 20, wherein the electronic circuit includes a microcontroller programmed with a known volume of the container between the first electrode and the second electrode, the microcontroller configured to determine the flow rate based on the known volume and the time elapsed between when the liquid level reaches the first electrode and when the liquid level reaches the second electrode.

* * * * *

UNITED STATES PATENT AND TRADEMARK OFFICE
CERTIFICATE OF CORRECTION

PATENT NO. : 8,297,131 B2
APPLICATION NO. : 12/719040
DATED : October 30, 2012
INVENTOR(S) : William C. Hughes Page 1 of 1

It is certified that error appears in the above-identified patent and that said Letters Patent is hereby corrected as shown below:

In the Claims:

Col. 6, line 51, the word "is" should be removed.

Signed and Sealed this
Eleventh Day of June, 2013

Teresa Stanek Rea
*Acting Director of the United States Patent and Trademark Office*